S. D. WALDON.
MOTOR VEHICLE DRIVING AXLE.
APPLICATION FILED AUG. 1, 1912.

1,228,504.

Patented June 5, 1917.
2 SHEETS—SHEET 1.

Witnesses
P. J. Gathmann
B. M. Kent

Inventor
Sidney D. Waldon
by Foster Freeman Watson & Co.
Attorneys

S. D. WALDON.
MOTOR VEHICLE DRIVING AXLE.
APPLICATION FILED AUG. 1, 1912.
1,228,504.
Patented June 5, 1917.
2 SHEETS—SHEET 2.
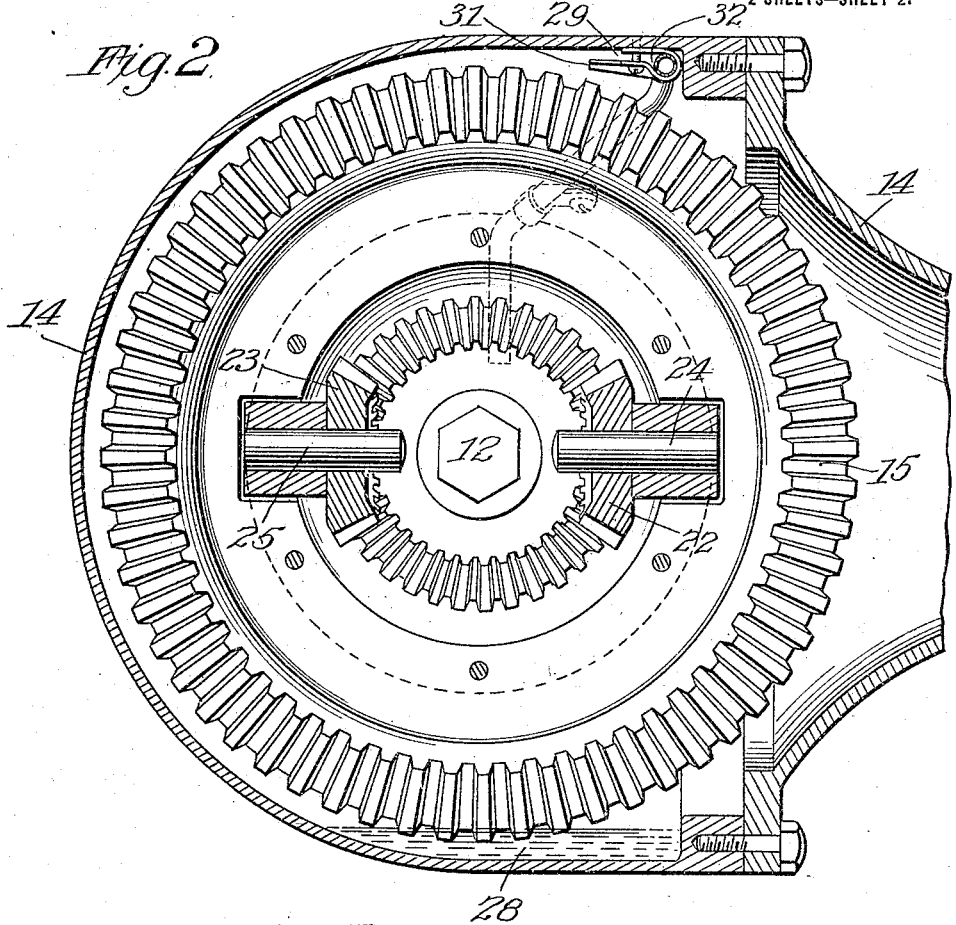
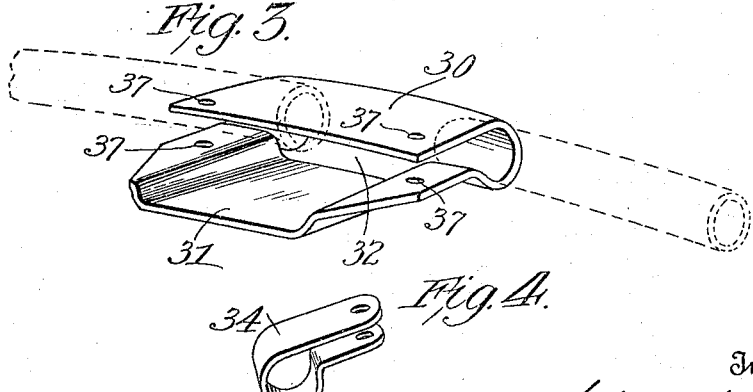
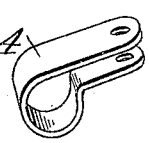

UNITED STATES PATENT OFFICE.

SIDNEY D. WALDON, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE DRIVING-AXLE.

1,228,504.  Specification of Letters Patent.  Patented June 5, 1917.

Application filed August 1, 1912. Serial No. 712,825.

*To all whom it may concern:*

Be it known that I, SIDNEY D. WALDON, a citizen of the United States, and resident of Detroit, in the county of Wayne and State of Michigan, have invented certain new and useful Improvements in Motor-Vehicle Driving-Axles, of which the following is a specification.

This invention relates to motor vehicles and more particularly to means for lubricating the differential mechanism and bearings within the driving axle.

Motor vehicles as commonly constructed have driving axles which consist of two stationary tubular members within which are arranged the driving shafts for the wheels. These tubular members are connected together by a casing containing the differential mechanism which is mounted on and operatively connected with the inner ends of the driving shafts. The differential mechanism usually comprises a housing or frame which carries the differential gears. It has been found that when the vehicle runs at high speed the oil is thrown out of this housing by centrifugal force and as a consequence the gears run "dry". This would not be of serious consequence were it not for the fact that when the vehicle is running at high speeds the differential gears are almost constantly in motion due to the vehicle being turned and to unevenness in the road which causes one or the other of the rear wheels to leave the ground.

It is the object of my invention therefore to provide means for supplying oil to the differential gears in order to make up for that which is lost in the manner above described. The novel features of the invention will be apparent from the following description taken in connection with the accompanying drawings, in which:

Fig. 2 is a transverse section on the line 2—2 of Fig. 1;

Figs. 3 and 4 are perspective views of details.

Figure 1:
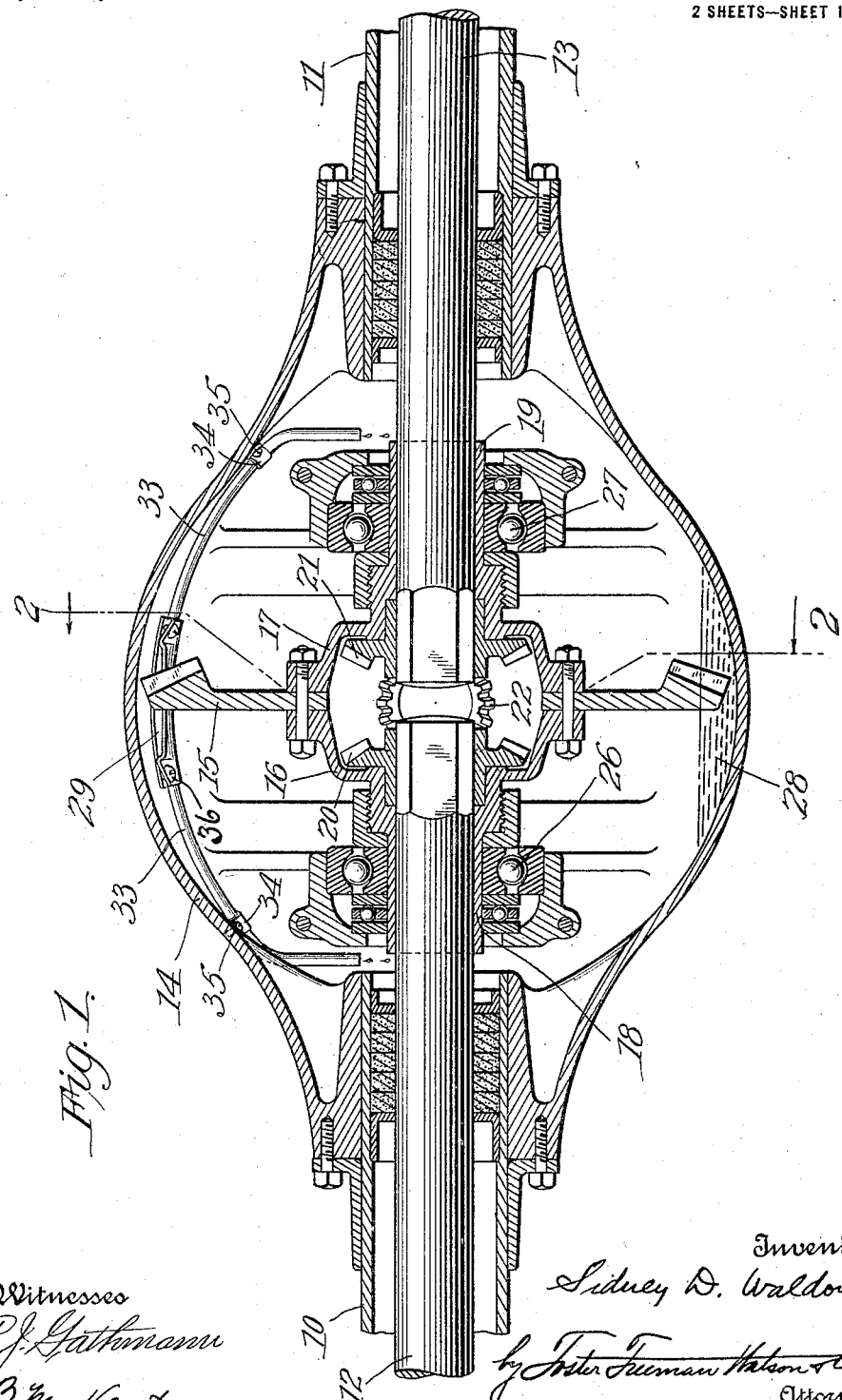
Figure 1 is a longitudinal section through the central part of a motor vehicle rear axle.

Referring to the drawings, a motor vehicle driving axle is shown, comprising the stationary axle tubes 10 and 11 within which are arranged the driving shafts 12 and 13, and a casing 14 which is secured to the inner end of the tubes 10 and 11 and incloses the differential mechanism which for the purpose of my invention may be of any preferred construction. In order to illustrate the invention I have shown a differential mechanism comprising a gear 15 which has bolted thereto the housing sections 16 and 17, these housing sections extending outwardly and forming bearings 18 and 19 for the shafts 12 and 13, respectively. As the housing sections and gear 15 are rigidly connected it will be noted that they in fact constitute a rotatable member. Arranged on the inner ends of the shafts 12 and 13 and operatively connected therewith are the gears 20 and 21, these gears being within the housing formed by the sections 16 and 17 and meshing with idler gears 22 and 23 which are mounted on stub shafts 24 and 25 carried by the gear 15 and the housing sections 16 and 17. It will be seen that the hubs of the gears 20 and 21 also have bearings in the housing sections 16 and 17 and for the purposes of this invention these bearings may be included as part of the bearings of the inner ends of the shafts in the housing sections, as one is merely a continuation of the other and either would alone support the inner end of an axle section or shaft. The housing sections 16 and 17 are in turn mounted in suitable separated bearings 26 and 27 carried by the casing 14. The construction so far described is well known and in common use.

It will be seen that in the above construction there is a tendency for any oil that may be in the differential housing to be thrown out by centrifugal force at high speed, but that more or less oil will be drawn into the housing partly by capillary attraction along the shafts 12 and 13 if supplied to the shafts at the exposed parts outboard from the bearings 26 and 27.

For the purpose of lubricating the parts the casing 14 may be provided with a body of lubricating oil 28 into which the gear 15 dips so that as this gear revolves the oil will be carried upwardly thereby and splashed and distributed to the various parts contained within the casing. It will be observed however that since the gears 20, 21, 22 and 23 are within the housing formed by the sections 16 and 17 they would not ordinarily be supplied with lubricant, and in order to supply these gears I have provided means for feeding oil to the exposed parts of the shafts 12 and 13 whereby it may work into the differential gears, this means as shown comprising a catcher or pan 29 adjacent the upper part of the gear 15 and so arranged that oil will be thrown into or against the same by the gear as the latter revolves. This catcher or pan may be of any preferred shape and in the preferred embodiment thereof, which is illustrated in the drawings, it consists of a generally U-shaped plate having a flat upper portion 30 which is adapted to lie against the inner surface of the casing 14, and the lower trough-shaped portion 31, which is spaced from the casing 14 and so inclined that the oil flows therein to the curved portion 32. Pipes or conduits 33 are secured in the ends of the curved portion 32 and lead the oil to the exposed parts of the shafts. As shown, it is led directly to the shafts, the pipes going to points directly above the shafts 12 and 13 and beyond the bearings 18 and 19 so that the oil will flow from the catcher through these tubes onto the shafts, and thence through the bearings 18 and 19, to the differential gears 21, 22, 23 and 24. Since the oil is being constantly thrown out of the housing for the differential gears, and returned in the manner above described, it will be seen that by the use of my invention the oil is made to circulate through the parts requiring lubrication.

In order to securely hold the pipes 33 in position clips 34 may be provided, these clips being secured to the casing 14 by means of screws 35. The catcher 29 is held in position by means of screws 36 which pass through suitable openings 37 therein and engage the casing 14.

It will be obvious to those skilled in the art that various changes may be made in the details of the invention within the scope of the appended claims and therefore I do not wish to be limited to the exact details shown and described.

Having thus described the invention, what is claimed is:

1. In a motor vehicle driving axle, the combination of a tubular axle casing, differential mechanism including a housing mounted in bearings therein, shafts connected to said mechanism and having bearings for their inner ends in said housing, a driving wheel mounted on said housing, and means for catching oil from said wheel and feeding it to said shafts adjacent their bearings in said housing.

2. In a motor vehicle driving axle, the combination of a tubular axle casing, differential mechanism including a housing mounted in bearings therein, shafts connected to said mechanism and having bearings for their inner ends in said housing, a driving wheel mounted on said housing, and means for catching oil from said wheel and feeding it around said differential housing bearings to the shafts adjacent their bearings in said housing.

3. In a motor vehicle driving axle, the combination of a tubular axle casing, differential mechanism including a housing having sleeves mounted in separated bearings therein, shafts connected to said mechanism and having bearings in said sleeves, said shafts being exposed within the axle casing at the outer sides of said separated bearings, a drive wheel mounted on said housing, and an oil catcher adapted to transfer oil from adjacent the periphery of said wheel to the exposed parts of said shafts at points immediately at the outer sides of said separated bearings.

4. In a motor vehicle driving axle, the combination of a tubular axle casing, differential mechanism including a housing having sleeves mounted in separated bearings therein, shafts connected to said mechanism and having bearings in said sleeves, said shafts being exposed within the axle casing at the outer sides of said separated bearings, a drive wheel mounted on said housing, and an oil catcher detachably secured to the interior of the axle casing and comprising a receiving trough and feeding channels, said catcher being adapted to transfer oil from adjacent the periphery of said wheel to the exposed parts of said shafts whereby the rotation of said differential mechanism and shafts will cause a constant circulation of oil through the shaft bearings and differential gears.

5. In a motor vehicle driving axle, the combination of a tubular axle casing, differential mechanism including a rotatable housing mounted in said casing, axle shafts in said casing having bearings for their inner ends in said housing, said shafts being adapted to rotate simultaneously with or relatively to said housing, a driving wheel on said housing, and means to catch oil from said driving wheel and feed it to said shafts adjacent the bearings in said housing.

6. In a motor vehicle driving axle, the combination of an axle casing, a rotatable member mounted in said casing, elements having bearings in said member and adapted to rotate simultaneously with or relatively to said member, and means mounted in said casing to transfer oil raised by the said rotatable member to the rotatable elements adjacent the bearings in said rotatable member for said elements.

7. A motor vehicle driving axle having a tubular axle casing, spaced bearings in said casing, differential mechanism including a housing having alined sleeves rotatably mounted in said bearings, axle shafts rotatably mounted in said sleeves and extending into the housing, gearing in said housing and connecting said axle shafts, and a driving wheel carried by said housing, in combination with means for lubricating the gearing in said housing and the bearings between the axle shafts and sleeves, comprising a device for catching oil from the wheel as it rotates and feeding it to the axle sections adjacent the bearings in the sleeves.

In testimony whereof I affix my signature in presence of two witnesses.

SIDNEY D. WALDON.

Witnesses:
CHAS. J. FITZSIMONS,
LE ROI T. WILLIAMS.